UNITED STATES PATENT OFFICE.

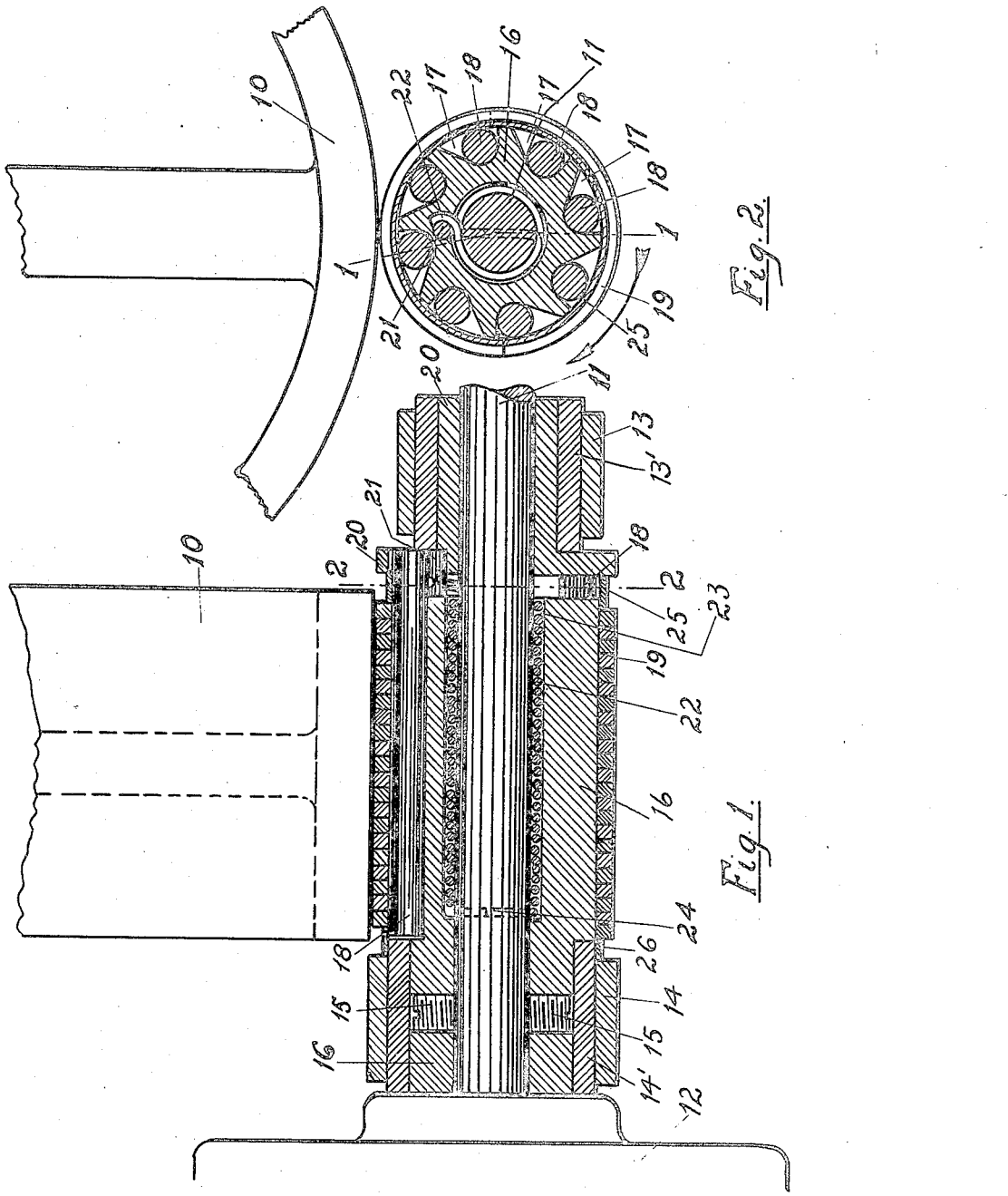

PRESTON E. GILLING, OF EAST ORANGE, NEW JERSEY.

FRICTION DRIVING DEVICE.

1,126,443.

Specification of Letters Patent.

Patented Jan. 26, 1915.

Application filed January 5, 1914. Serial No. 810,347.

*To all whom it may concern:*

Be it known that I, PRESTON E. GILLING, a citizen of the United States, residing at East Orange, in the county of Essex, State of New Jersey, have invented certain new and useful Improvements in Friction Driving Devices; and I do declare the following to be a full, true, and exact description of said invention, such as will enable others skilled in the art to which it appertains to make and use the same.

This invention relates particularly to improvements in friction driving devices to be used in connection with motor starting apparatus, particularly as used in automobiles and motor boats.

As is understood in the art, it is usual to provide an electric motor driven by a current from any suitable source and to connect this motor through suitable devices with some part of the gas motor, usually the fly wheel. When the electric motor is started, the gas motor is "cranked" until it in turn starts and from that time on the electric motor is either thrown out of engagement or is thrown out of action. In my present invention, I have provided a means for connecting such an electric motor to the fly wheel of the gas motor, such means including a friction device which is very efficient and which is arranged to disconnect the electric motor from the gas motor when the latter begins to run faster than the electric motor, and which is arranged so that it begins to rotate the gas motor as soon as the electric motor is started. While my driving device is particularly useful in the starting of gas motors, it will be understood that it may be used in connection with any driving mechanism, regardless of the use, and may be used to drive any driven member, whether circular or not.

With these and other objects in view, my invention consists of certain novel features of construction, combination and arrangement of parts as will be more fully pointed out in the appended claims.

In the drawings, Figure 1 represents a longitudinal cross section through my novel driving device, taken on line 1—1 of Fig. 2, and Fig. 2 represents a cross section of Fig. 1 on the lines 2—2.

The corresponding parts are referred to both in the drawings and specification by similar reference characters.

Referring to the drawings, 10 represents a fly wheel which I have selected as a driven member in connection with the specific form of my arrangement which I have chosen for purposes of illustration.

11 is a driving shaft rotated by a motor 12. In the illustration, I have provided two bearings 13, 14 with bushings 13' and 14', respectively for the shaft 11. Connected to the shaft 11 by the screws 15 is a grooved member 16. The grooves, as shown at 17 in Fig. 2, carry pins 18 and are shaped so that as the grooved member 16 rotates in the direction of the arrow on Fig. 2, the pins 18, if prevented from rotating, will move radially away from the shaft 11. Surrounding the pins 18 is a helical spring 19 with its ends free so that, as the pins 18 move radially from the shaft 11, the spring 19 may be expanded in diameter.

The ends of the pins 18 are carried in the flange of a bushing 20 on the shaft 11 within the bearing 13. The holes in the flange may be slotted to permit the pins 18 to move radially from shaft 11. The bushing 20 carries a pin 21 and connected to the pin 21 is one end of a coil spring 22 located in a recess 23 in the grooved member 16 and having its opposite end inserted in the shaft 11, as at 24. This spring 22 has sufficient strength so that, when it is free to operate, it will turn the bushing 20 and thereby move the pins 18 in the groove 17 so as to expend the spring 19 until it contacts with the fly wheel 10.

It will be understood that the spring 19 may be of any cross section, though I prefer to make it of square wire so as to have a flat driving surface. I provide split ring washers 25 and 26 between the ends of the spring 19 and the ends of the bearing and the flanged bushing 20, to keep the spring 19 in place longitudinally of the member 16. It will also be understood that I provide sufficient of the pins 18 so that the spring 19 will remain substantially cylindrical in form as it is expanded.

Assuming that the pins 18 have been moved by the spring 22 until the spring 19 is in contact with the driven member 10, it is clear that when the shaft 11 is rotated in the direction of the arrow on Fig. 2, the member 10 will also be moved. The greater the resistance to turning offered by the member 10, the greater will be the frictional driving power of the spring 19, for the pins 18 will be moved outward by any holding back of the spring 19 relatively to the grooved member 16. Now when the gas motor begins to operate and to move the surface of the wheel 10 faster than the surface of the spring 19 is being moved by the rotation of the shaft 11, it is obvious that the spring 19 will be carried ahead slightly, and thus roll the pins 19 in the grooves 17 so as to relieve the pressure between the spring 19 and the wheel 10.

In some arrangements of my device, it will not be necessary to use the bushing 20 and the spring 22, though this is generally desirable since this arrangement provides a means by which the spring 19 is kept constantly adjusted into light contact with the driven member 10, ready to operate as soon as desired. No adjustments for wear are therefore necessary.

While I have shown one embodiment of my invention, it will be understood that it may assume many different forms, it being my primary purpose to provide a radially expansible member as one part of a friction drive with the expansible member preferably in the form of a coil spring.

Having now described my invention, what I claim as new and desire to secure by Letters Patent is as follows:

1. A driven member, a rotatable driving member, an expansible member on said driving member and adapted to contact with said driven member, and means arranged to be rotated by said driving member and adapted and arranged to expand said expansible member when said means is rotated relatively to said expansible member.

2. A driven member, a driving shaft, a grooved member on said shaft and attached thereto, pins in said grooves, a helical radially expansible spring surrounding said pins and arranged to contact with said driven member, said grooves being constructed and arranged to move said pins away from said shaft and against the interior of said spring to expand it, when said grooved member is turned relatively to said spring, a member engaging the ends of said pins and a spring arranged to turn said member to move said pins in said groove to expand said helical spring.

3. A driven member, a driving shaft, a grooved member on said shaft and attached thereto, pins in said grooves and a helical radially expansible spring surrounding said pins and arranged to contact with said driven member, said grooves being constructed and arranged to move said pins away from said shaft and against the interior of said spring to expand it when said grooved member is turned relatively to said spring.

4. A driven member, a grooved driving member, pins in said grooves, and a helical radially expansible spring surrounding said pins and arranged to contact with said driven member, said grooves being constructed and arranged to move said pins away from said shaft and against the interior of said spring to expand it when said grooved member is turned relatively to said spring.

5. A driven member, a rotatable driving member, a helical radially expansible spring around said driving member and independent thereof, and arranged to contact with said driven member, and means operable by the rotation of said driving member to expand said spring.

6. A driven member, a rotatable driving member, a helical radially expansible spring around said driving member and independent thereof and arranged to contact with said driven member, and clutching means adapted and arranged to connect said spring and said driving member and to expand said spring to cause it to contact with and drive said driven member.

7. A driven member, a rotatable driving member, a helical radially expansible spring around said driving member and independent thereof, and arranged to contact with said driven member, clutching means adapted and arranged to connect said spring and said driving member and to expand said spring to cause it to contact with and drive said driven member, and spring actuating means constructed and arranged to coöperate with said clutching means to hold said helical spring expanded into contact with said driven member.

8. A driven member, a driving shaft, a grooved member on said shaft and attached thereto, pins in said grooves, a helical radially expansible spring surrounding said pins and arranged to contact with said driven member, said grooves being constructed and arranged to move said pins away from said shaft and against the interior of said spring to expand it, when said grooved member is turned relatively to said spring, a rotatable member on said shaft and independent thereof and constructed and arranged to engage the ends of said pins, a coiled spring having one end attached to said shaft and the other to said rotatable member, and arranged to rotate said member to move said pins in said grooves to expand said helical spring.

PRESTON E. GILLING.

Witnesses:
 NATHAN REIFF,
 EDW. L. WATERBURY.